US010293281B2

(12) United States Patent
Poirier

(10) Patent No.: US 10,293,281 B2
(45) Date of Patent: May 21, 2019

(54) FLUID FILTER SYSTEM WITH AUTO DRAIN

(71) Applicant: AXI INTERNATIONAL, Fort Myers, FL (US)

(72) Inventor: Jeffrey Donald Poirier, Cape Coral, FL (US)

(73) Assignee: AXI International, Fort Myers, FL (US)

( * ) Notice: Subject to any disclaimer, the term of this patent is extended or adjusted under 35 U.S.C. 154(b) by 0 days.

(21) Appl. No.: 15/836,485

(22) Filed: Dec. 8, 2017

(65) Prior Publication Data

US 2018/0161702 A1 Jun. 14, 2018

Related U.S. Application Data

(60) Provisional application No. 62/432,228, filed on Dec. 9, 2016.

(51) Int. Cl.
| | |
|---|---|
| *B01D 25/00* | (2006.01) |
| *B01D 35/02* | (2006.01) |
| *B01D 35/00* | (2006.01) |
| *B01D 35/153* | (2006.01) |
| *B01D 35/16* | (2006.01) |
| *B01D 29/52* | (2006.01) |
| *B01D 29/56* | (2006.01) |
| *F16K 15/02* | (2006.01) |

(52) U.S. Cl.
CPC ........... *B01D 25/003* (2013.01); *B01D 29/52* (2013.01); *B01D 29/56* (2013.01); *B01D 35/005* (2013.01); *B01D 35/02* (2013.01); *B01D 35/153* (2013.01); *B01D 35/16* (2013.01); *F16K 15/021* (2013.01)

(58) Field of Classification Search
CPC ...... B01D 25/003; B01D 29/52; B01D 29/56; B01D 35/005; B01D 35/02; B01D 35/153; B01D 35/16; F16K 15/021
See application file for complete search history.

(56) References Cited

U.S. PATENT DOCUMENTS

| | | | | |
|---|---|---|---|---|
| 5,520,801 | A * | 5/1996 | Gerber | B01D 29/15 210/130 |
| 8,231,793 | B2 * | 7/2012 | Hacker | B01D 29/15 123/196 A |
| 2003/0010697 | A1 * | 1/2003 | Sann | B01D 29/23 210/234 |
| 2018/0133631 | A1 * | 5/2018 | Willems | B01D 29/33 |

\* cited by examiner

*Primary Examiner* — Terry K Cecil
(74) *Attorney, Agent, or Firm* — Hahn Loeser & Parks LLP

(57) ABSTRACT

A fluid filter system has at least one filter having a filter head removable filter element, the filter being oriented inverted. A first filter drain check valve is provided with its inlet in fluid communication with the inlet of the at least one filter, and a second filter drain check valve is provided with its inlet in fluid communication with the outlet of the at least one filter. A filter outlet check valve is provided with its inlet in fluid communication with the outlet of at least one filter head. An openable valve is provided in fluid communication with the outlets of the first and second filter drain check valves. A drain pump is provided with its intake in fluid communication with the valve. A drain pump check valve is included with its inlet in fluid communication with the output of the drain pump and an outlet in fluid communication with the outlet of the filter outlet check valve.

17 Claims, 4 Drawing Sheets

FLUID FILTER SYSTEM WITH AUTO DRAIN

BACKGROUND

Tolerances for engine components and other equipment parts have tightened and continue to tighten. The benefits of reducing tolerances include improved emission control and efficiency, resulting in improved regulatory compliance and marketability. However, reducing tolerances places increased focus on maintaining the cleanliness of the working fluids. For example, requirements for particle filtration continue to rise for fluids such as engine lubricants.

One of the methods for fluid cleanliness control is utilization of the spin on filters of various efficiencies. Such filters typically include a filter head with inlet and outlet ports and a spin-on filter element. They are traditionally installed with the filter head located above the filter element (the filter element is screwed on from the bottom). During use, the filter elements accumulate fluid within the filter element housing. During replacement of traditionally-mounted spin on filters, the filters entrap working fluid. Special care must be taken during filter replacement to avoid excessive spillage.

There have been previous attempts to install the filters in inverse orientation (i.e., spin-on filter installed on top of the filter head). While such installations may result in some draining of the filter element by gravity, mere inverse installation still presents a high risk of spillage of fluid remaining in the filter element and/or filter head during the filter replacement.

SUMMARY OF THE INVENTION

A Filter Inversion and Auto Drain System is presented herein. The Filter Inversion and Auto Drain System addresses the risk of spillage during element replacement by actively draining the fluid from the filter element and filter head prior to filter element removal. The system removes accidental spill risk and reduces filter replacement effort.

Various embodiments of the invention include installation of the spin-on filters upside-down to their usual orientation, flow routing valves, a positive displacement pump (typically DC driven, PLC or Relay Logic controlled), a filter to protect the pump from contaminants, a check valve to prevent back flow into the filters, and a check valve open to atmosphere to allow for proper venting of the filters during draining.

In one example, a fluid filter system has at least one filter having a filter head with an inlet and an outlet and a removable filter element (such as a spin-on canister filter element), the filter being oriented such that the filter element is above the filter head. A first filter drain check valve is provided with its inlet in fluid communication with the inlet of the at least one filter, and a second filter drain check valve is provided with its inlet in fluid communication with the outlet of the at least one filter. A filter outlet check valve is provided with its inlet in fluid communication with the outlet of at least one filter head. An openable valve is provided in fluid communication with the outlets of the first and second filter drain check valves. The valve may be a solenoid valve. A drain pump is provided with its intake in fluid communication with the valve. A drain pump check valve is included with its inlet in fluid communication with the output of the drain pump and an outlet in fluid communication with the outlet of the filter outlet check valve.

The fluid filter system may include a drain pump filter to protect the filter pump. The drain pump filter may be disposed between the outlets of the first and second drain check valves and openable valve, wherein the fluid communication between the outlets of the first and second filter drain check valves and the openable valve is provided at least in part by the drain pump filter. Also, the drain pump filter may be disposed between the openable valve and the drain pump, wherein the fluid communication between the openable valve and the drain pump is provided at least in part by the drain pump filter.

The fluid filter system may further include a vent check valve having an inlet exposed to atmosphere and an outlet in fluid communication with one of the inlet and the outlet of the filter head of the at least one filter.

The fluid filter system may comprise a plurality of filters. For example, a first filter and a second filter may be coupled in tandem, each filter having a filter head with an inlet and an outlet and a removable filter element, and each filter being oriented such that the filter element is above the filter head. In this example, a third filter drain check valve may be provided, having an inlet in fluid communication with the outlet of the second filter and an outlet in fluid communication with the outlets of the first and second filter drain check valves and the openable valve. In another example, a first filter and a second filter may be coupled in parallel, each filter having a filter head with an inlet and an outlet and a removable filter element, and each filter being oriented such that the filter element is above the filter head.

In another example, a fluid filter system may use openable valves in place of many of the check valves. This example includes at least one filter having a filter head with an inlet and an outlet and a removable filter element, the filter being oriented such that the filter element is above the filter head. A first openable filter drain valve is provided in fluid communication with the inlet of the at least one filter, and a second openable filter drain valve is provided in fluid communication with the outlet of the at least one filter. The openable filter drain valves may each comprise a solenoid valve A filter outlet check valve is provided, having an inlet in fluid communication with the outlet of at least one filter head, and an outlet. As in the earlier example, the system includes a drain pump having an intake in fluid communication with the first openable filter drain valve and the second openable filter drain valve, and an output, and a drain pump check valve having an inlet in fluid communication with the output of the drain pump and an outlet in fluid communication with the outlet of the filter outlet check valve.

A drain pump filter in fluid communication with the intake of the drain pump may be included, wherein the fluid communication between the first openable filter drain valve and the second openable filter drain valve and the drain pump is provided at least in part by the drain pump filter. As with the previous example, a vent check valve having an inlet exposed to atmosphere and an outlet in fluid communication with one of the inlet and the outlet of the filter head of the at least one filter may be included.

The fluid filter system may include first filter and a second filter coupled in tandem, each filter having a filter head with an inlet and an outlet and a removable filter element, and each filter being oriented such that the filter element is above the filter head. A third openable filter drain valve in fluid communication between the outlet of the second filter and the intake of the drain pump may be included. In another example, a first filter and a second filter are coupled in parallel, each filter having a filter head with an inlet and an outlet and a removable filter element, and each filter being oriented such that the filter element is above the filter head.

BRIEF DESCRIPTION OF THE DRAWINGS

Describing various embodiments of the invention will reference the following drawings (may not be drawn to scale).

DETAILED DESCRIPTION OF THE INVENTION

Figure 1:
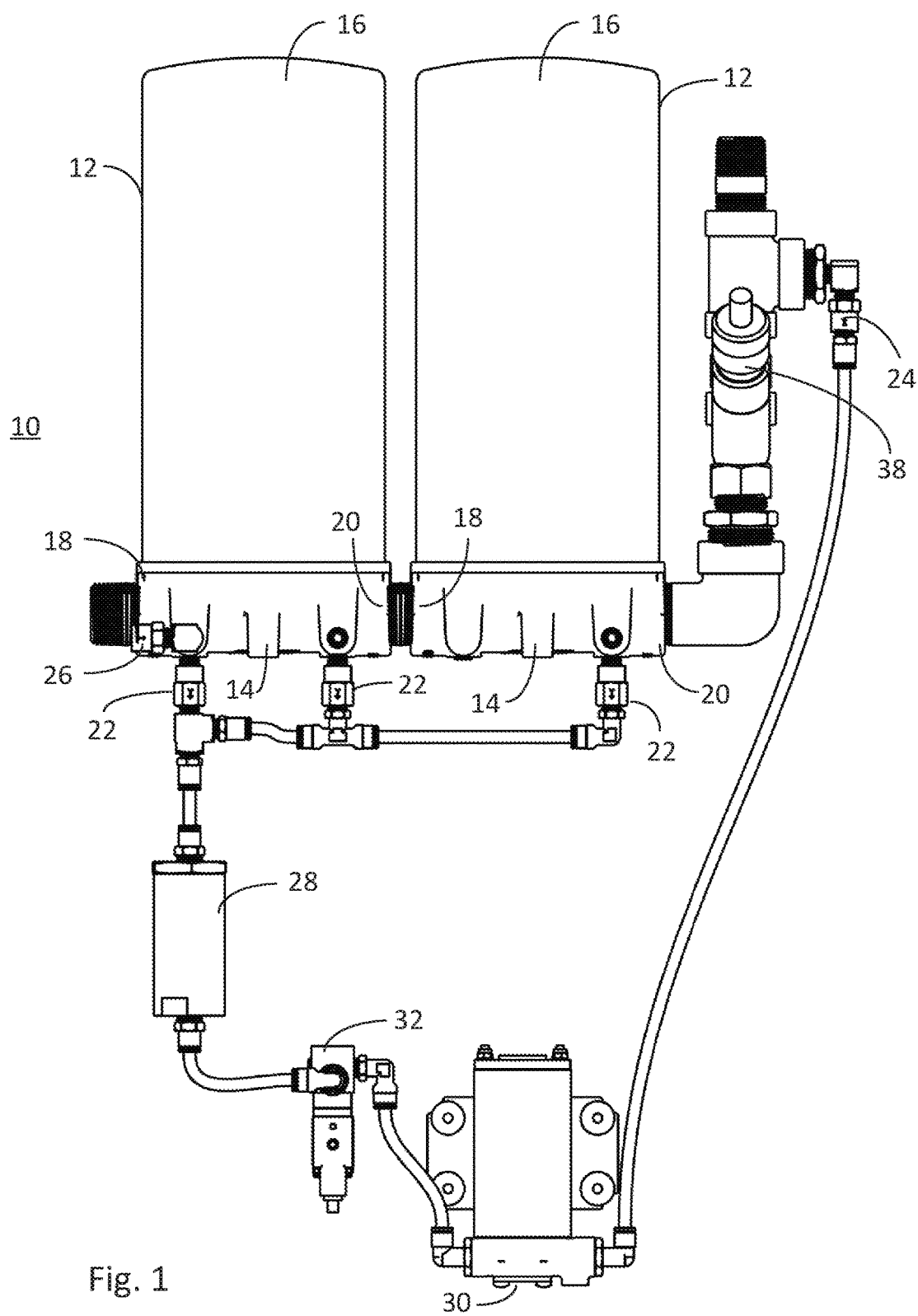
FIG. 1 is an illustration of an example of a system according to the present invention with filters in series.
Figure 2:
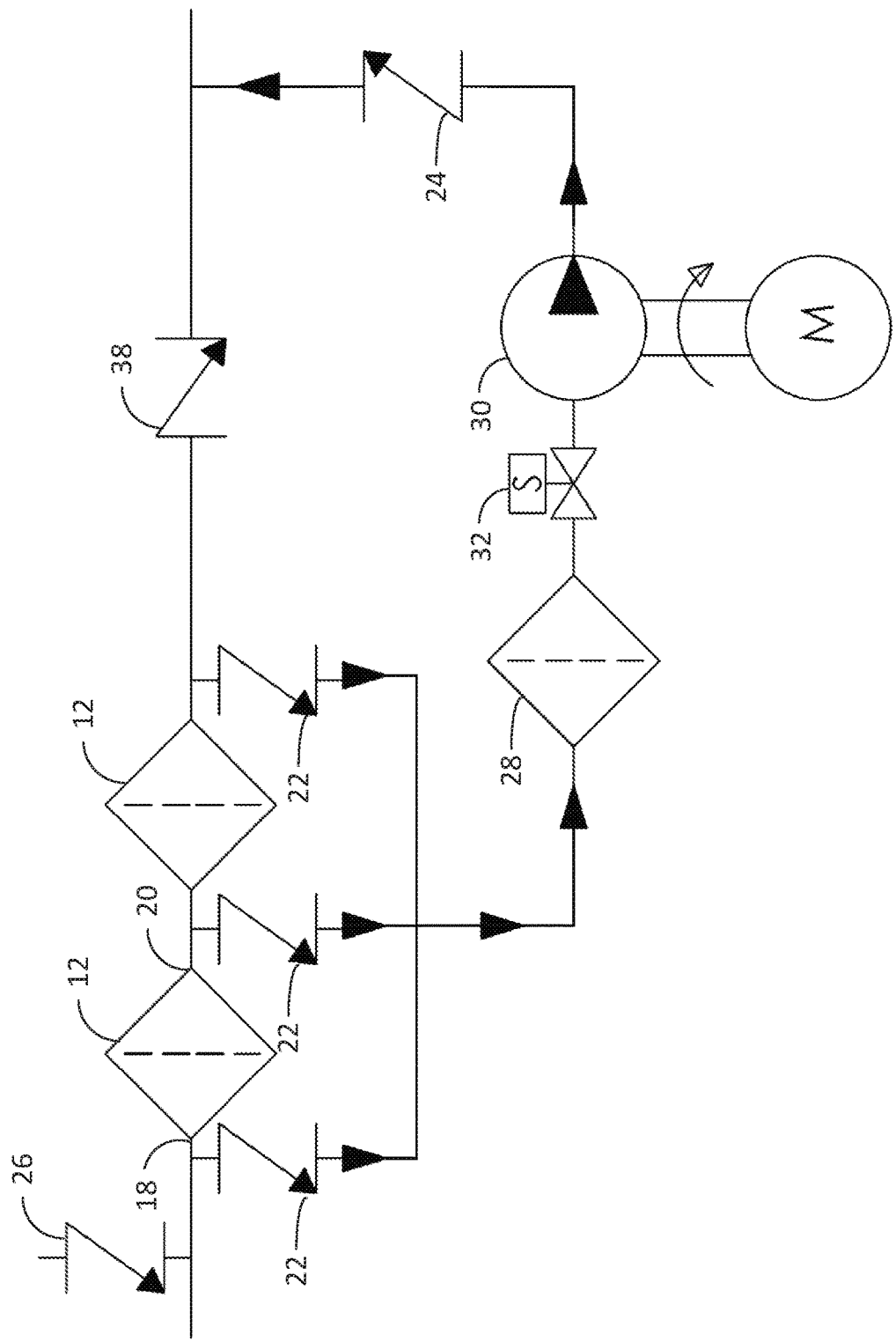
FIG. 2 is a schematic diagram of the system according FIG. 1.

As illustrated in FIGS. 1 and 2, an example of a fluid filter system 10 with automatic drain capabilities is illustrated. The fluid filter system 10 comprises one or more filters 12, each filter 12 comprising a spin-on filter element 16 and a filter head 14. The filters are oriented in an inverse (upside-down) orientation, with the filter elements 16 over the filter heads 14. In FIGS. 1 and 2, the fluid flow in normal operation is from left to right. The filters 12 have their inlets 18 on their left side and outlets 20 on their left side. Filters 12 are primary duty filters. In this example we have two filters in series, but the invention may be readily adapted to additional filters in series or a single filter, and to filters in parallel.

Filter drain check valves 22 are connected to the filter heads 14. Check valves allow fluid to flow in one direction, and block ("check") fluid flowing in the reverse direction. The filter drain check valves 22 are oriented to allow fluid to flow away from the filter heads 14, with the inlets oriented toward the filter heads 14 and outlets oriented away from filter heads 14. In this orientation, with the outlets of the filter drain the filter drain check valves 22 coupled together, check valves 22 prevent oil or other fluids from bypassing filter elements 16 during normal operation.

Existing gauge ports on the filter heads 14 may be used for the filter drain check valves 22, or the filter heads 14 may be drilled and tapped to accept the filter drain check valves 22. In another example, filter drain check valves 22 may be coupled to fluid conduits attached to the inlet 18 and/or outlet 20. At least a first filter head 14 will have filter drain check valves 22 connected to an inlet side and an outlet side of the filter head. This provides for more complete draining of filter elements 16. If a second filter 12 is connected in tandem (as illustrated in FIGS. 1 and 2), only the outlet side of the second filter head 14 requires a check valve 22, as the inlet side of the second filter 12 is directly coupled to the outlet of the first filter 12.

The outlets of the filter drain check valves 22 that are attached to the filter heads 14 are fluidly coupled together and routed to a drain pump filter 28. The drain pump filter 28 is selectively coupled to an input of drain pump 30 by solenoid valve 32. Solenoid valve 32 is closed during normal operation and opened during filter draining operation. Any conventional means for the control of solenoids, such as an electronic controller, may be used to control the solenoid valves. The positions of drain pump filter 28 and solenoid valve 32 may also be reversed, as in the example of FIG. 3, without affecting operation of the system.

Drain outlet check valve 24 is connected to the output of the drain pump 30 and is oriented with its inlet toward drain pump 30 to prevent backflow of filtered oil to the drain pump 30 and/or drain pump filter 28 during normal operation. The inlet side of filter check valve 38 is coupled to the outlet 20 of the last filter head 14 of filters 12. Vent check valve 26 is also provided and coupled with its inlet to the atmosphere and outlet to a filter head 14. This allows venting of the filters during oil draining and reduces the risk of the filter media collapse due to vacuum during operation of drain pump 30.

During normal operation, solenoid valve 32 is closed, and fluids flow from inlet 18 to outlet 20 of each filter head 14 through the filter element 16 and filter check valve 38. During the filter replacement process, the flow of the fluid to the filters 12 is stopped. The fluid trapped in the filters is actively removed through the filter drain check valves 22, by the opening of solenoid valve 32, through the drain pump filter 28 and by pumping of the drain pump 30. The drain pump filter 28 is included to protect the drain pump 30 from the contaminants trapped in the fluid in the filters 12. The drain pump 30 pushes the fluid upstream of check valve 24. Filter check valve 38 prevents oil from back flowing into filters 12 after being pumped out by drain pump 30.

After the filters 12 are drained by the solenoid 32 and filter pump 30, the filter elements 16 may be removed with almost no fluid spilled. New filter elements may then be easily installed. After new filter element installation, the solenoid valve 32 is closed and fluid flow is again routed through the upside-down mounted filters 12.

Figure 3:
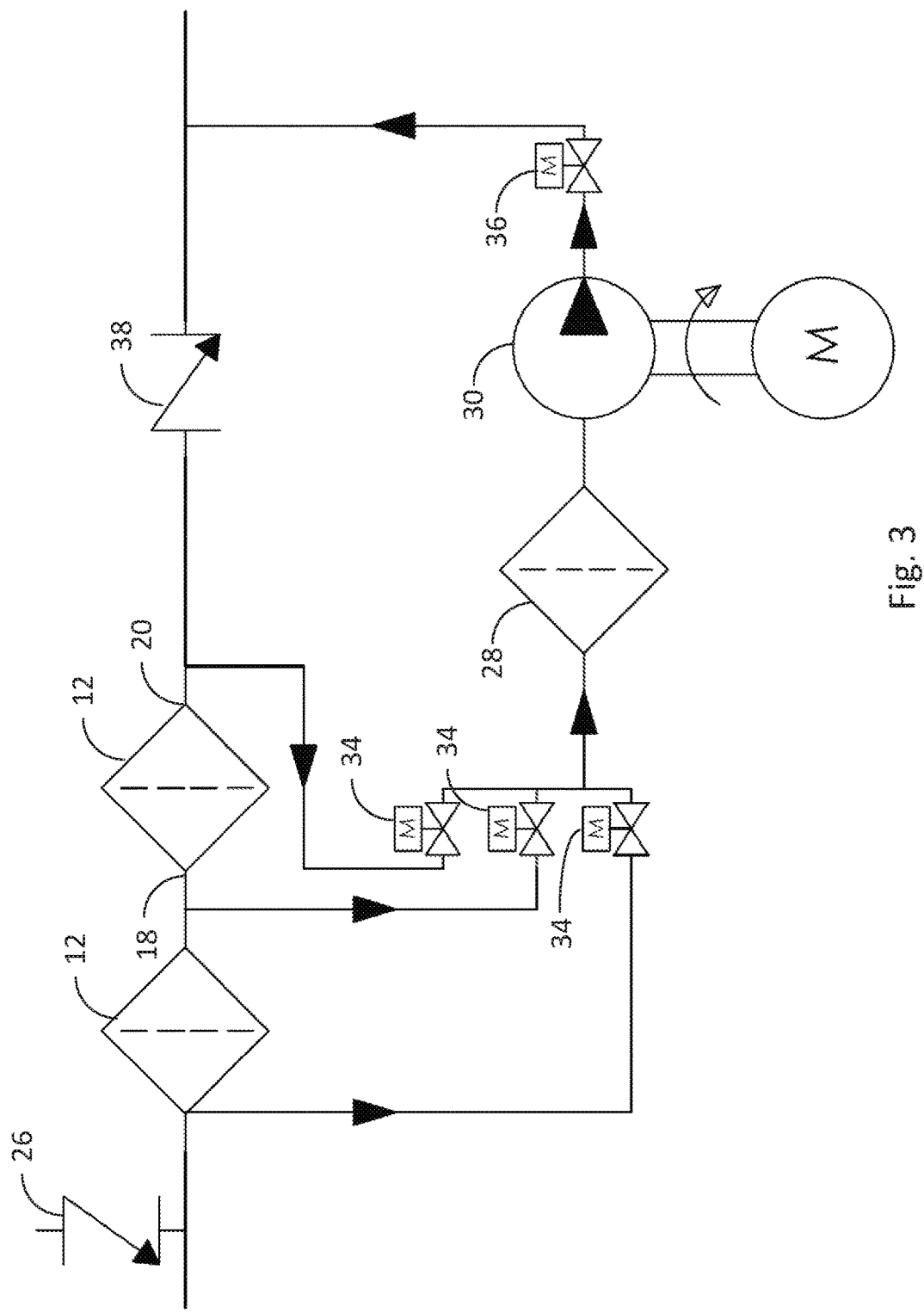
FIG. 3 is a schematic diagram of another example of system according to the present invention.

Another example of the present invention is illustrated in FIG. 3. This example also comprises one or more filters 12, each filter comprising a spin-on filter 16 element and a filter head 14. The filters are oriented in an inverse (upside-down) orientation, with the filter elements 16 over the filter heads 14. Filter solenoids valves 34 are coupled to the filter heads 14. At least a first filter head 14 will have filter solenoids valves 34 connected to an inlet side and an outlet side of the filter head. If a second filter 12 is connected in tandem (as illustrated), only the outlet side of the filter head requires a filter solenoids valves 34, as the inlet 18 of the second filter head 14 is directly coupled to the outlet 20 of the first filter head 14.

The filter solenoids valves 34 that are coupled to the filter heads 14 are fluidly coupled together and routed to drain pump filter 28. The drain pump filter 28 is fluidly coupled to filter pump 30. The outlet of drain pump 30 is coupled to output solenoid valve 36. Output solenoid valve 36 is oriented with its inlet toward the outlet of the drain pump 30 and its outlet coupled to the oil passage on the outlet side of filter check valve 38. The inlet side of filter check valve 38 is coupled to the outlet 20 of the last filter head 14 of filters 12.

During the filter replacement process, the flow of the fluid to the filters 12 is stopped. Solenoids valves 34 are opened and filters 12 are drained through the drain pump filter 28 and by operation of the drain pump 30. The drain pump 30 pushes the fluid through drain outlet check valve 24 and upstream of the filter check valve 38, which is installed to prevent back flow though the filters 12 being serviced.

Figure 4:
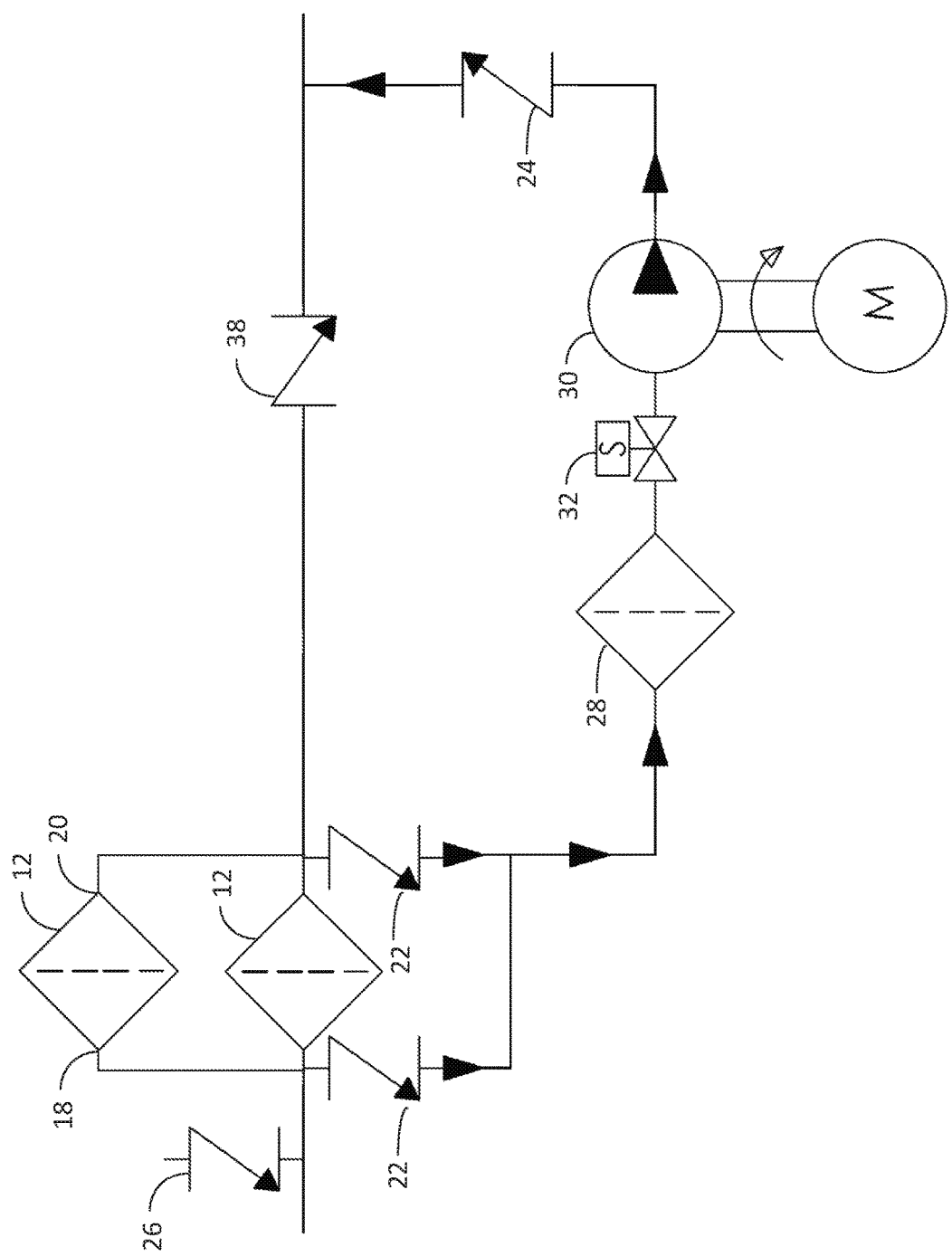
FIG. 4 is a schematic diagram of and the example of according to the present invention with filters in parallel.

Another example of the present invention is illustrated in FIG. 4. The components are the same as in FIGS. 1 and 2, and the description of such components is not repeated for purposes of brevity. The example of FIG. 4 differs from FIG. 2 in that the filters 12 are mounted in parallel rather than in series. Due to this arrangement, one fewer filter drain check valve 22 is needed. Normal operation and filter draining operations are the same as with respect to FIG. 2.

As may be seen from the examples presented herein, the check valves and solenoids may be rearranged into additional variations of check valves and solenoids without departing from the scope of the invention. Various embodiments may include different number of filters and valves installed, as well as components of different size. For example, filters may be connected in tandem or in parallel. Various embodiments may be installed and/or retrofitted on various equipment operating with various working fluids.

What is claimed is:

1. A fluid filter system, comprising:
    at least one filter having a filter head with an inlet and an outlet and a removable filter element, the filter being oriented such that the filter element is above the filter head;
    a first filter drain check valve having an inlet in fluid communication with the inlet of the at least one filter and an outlet;
    a second filter drain check valve having an inlet in fluid communication with the outlet of the at least one filter and an outlet;
    a filter outlet check valve, having an inlet in fluid communication with the outlet of at least one filter head, and an outlet;
    an openable valve in fluid communication with the outlets of the first and second filter drain check valves;
    a drain pump having an intake in fluid communication with the openable valve, and an output; and
    a drain pump check valve having an inlet in fluid communication with the output of the drain pump and an outlet in fluid communication with the outlet of the filter outlet check valve.

2. The fluid filter system of claim 1, further comprising a drain pump filter disposed between the outlets of the first and second drain check valves and openable valve, wherein the fluid communication between the outlets of the first and second filter drain check valves and the openable valve is provided at least in part by the drain pump filter.

3. The fluid filter system of claim 1, further comprising a drain pump filter disposed between the openable valve and the drain pump, wherein the fluid communication between the openable valve and the drain pump is provided at least in part by the drain pump filter.

4. The fluid filter system of claim 1, further comprising a vent check valve having an inlet exposed to atmosphere and an outlet in fluid communication with one of the inlet and the outlet of the filter head of the at least one filter.

5. The fluid filter system of claim 1, wherein the at least one filter comprises a first filter and a second filter coupled in tandem, each filter having a filter head with an inlet and an outlet and a removable filter element, and each filter being oriented such that the filter element is above the filter head.

6. The fluid filter system of claim 5, further comprising a third filter drain check valve having an inlet in fluid communication with the outlet of the second filter and an outlet in fluid communication with the outlets of the first and second filter drain check valves and the openable valve.

7. The fluid filter system of claim 1, wherein the at least one filter comprises a first filter and a second filter coupled in parallel, each filter having a filter head with an inlet and an outlet and a removable filter element, and each filter being oriented such that the filter element is above the filter head.

8. The fluid filter system of claim 1, wherein the openable valve comprises a solenoid valve.

9. The fluid filter system of claim 1, wherein the filter element comprises a spin-on canister filter element.

10. A fluid filter system, comprising:
    at least one filter having a filter head with an inlet and an outlet and a removable filter element, the filter being oriented such that the filter element is above the filter head;
    a first openable filter drain valve in fluid communication with the inlet of the at least one filter;
    a second openable filter drain valve in fluid communication with the outlet of the at least one filter;
    a filter outlet check valve, having an inlet in fluid communication with the outlet of at least one filter head, and an outlet;
    a drain pump having an intake in fluid communication with the first openable filter drain valve and the second openable filter drain valve, and an output; and
    a drain pump check valve having an inlet in fluid communication with the output of the drain pump and an outlet in fluid communication with the outlet of the filter outlet check valve.

11. The fluid filter system of claim 10, further comprising a drain pump filter in fluid communication with the intake of the drain pump, wherein the fluid communication between the first openable filter drain valve and the second openable filter drain valve and the drain pump is provided at least in part by the drain pump filter.

12. The fluid filter system of claim 10, further comprising a vent check valve having an inlet exposed to atmosphere and an outlet in fluid communication with one of the inlet and the outlet of the filter head of the at least one filter.

13. The fluid filter system of claim 10, wherein the at least one filter comprises a first filter and a second filter coupled in tandem, each filter having a filter head with an inlet and an outlet and a removable filter element, and each filter being oriented such that the filter element is above the filter head.

14. The fluid filter system of claim 13, further comprising a third openable filter drain valve in fluid communication between the outlet of the second filter and the intake of the drain pump.

15. The fluid filter system of claim 10, wherein the at least one filter comprises a first filter and a second filter coupled in parallel, each filter having a filter head with an inlet and an outlet and a removable filter element, and each filter being oriented such that the filter element is above the filter head.

16. The fluid filter system of claim 10, wherein the first and second openable filter drain valves each comprises a solenoid valve.

17. The fluid filter system of claim 10, wherein the filter element comprises a spin-on canister filter element.

* * * * *